April 7, 1959 R. E. ANNIS, JR 2,880,771
BARK-REMOVING TOOLS MOUNTED ON REVOLVING SELF-OPENING ARMS
Filed March 17, 1955 4 Sheets-Sheet 1
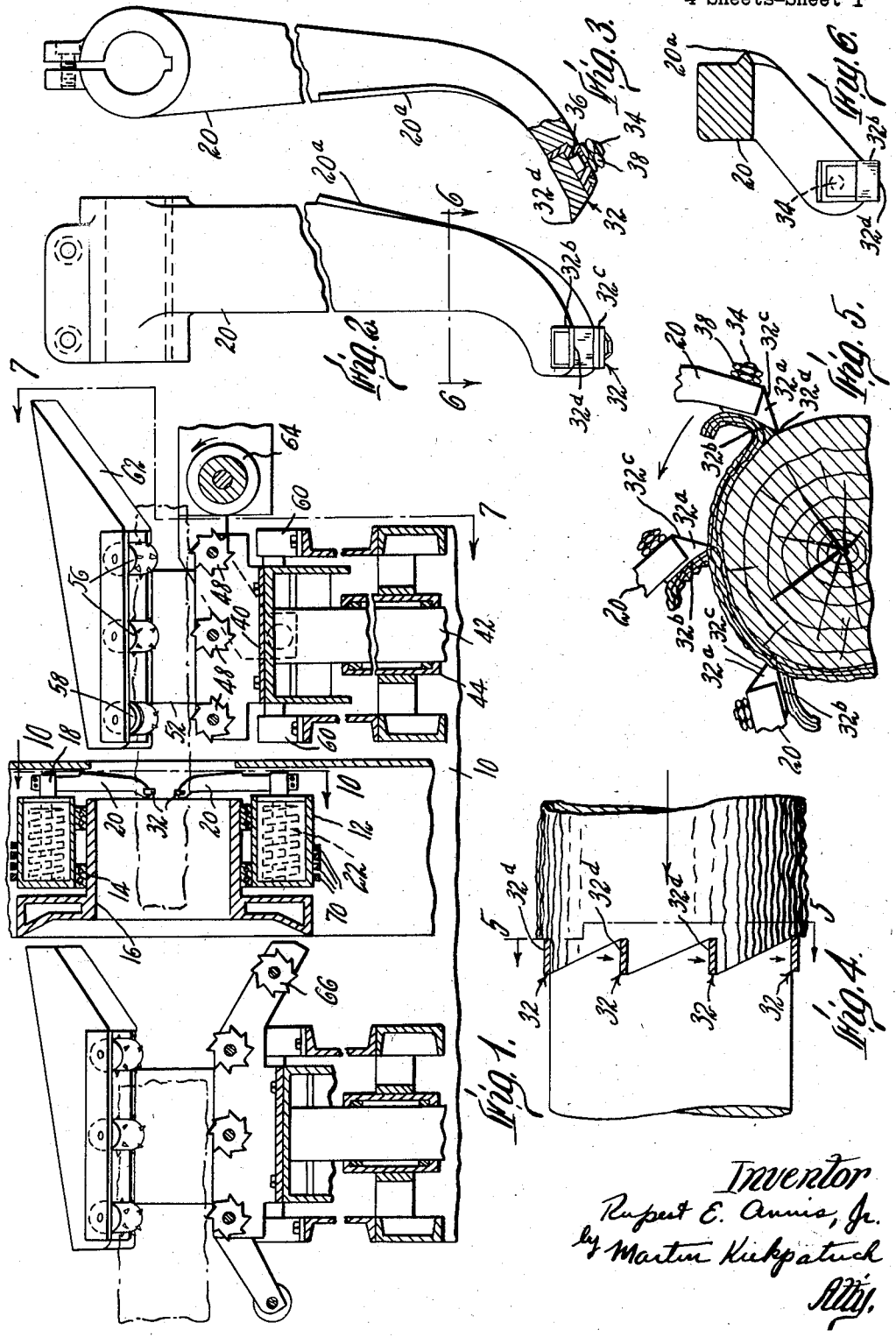
Inventor
Rupert E. Annis, Jr.
by Martin Kirkpatrick
Atty.

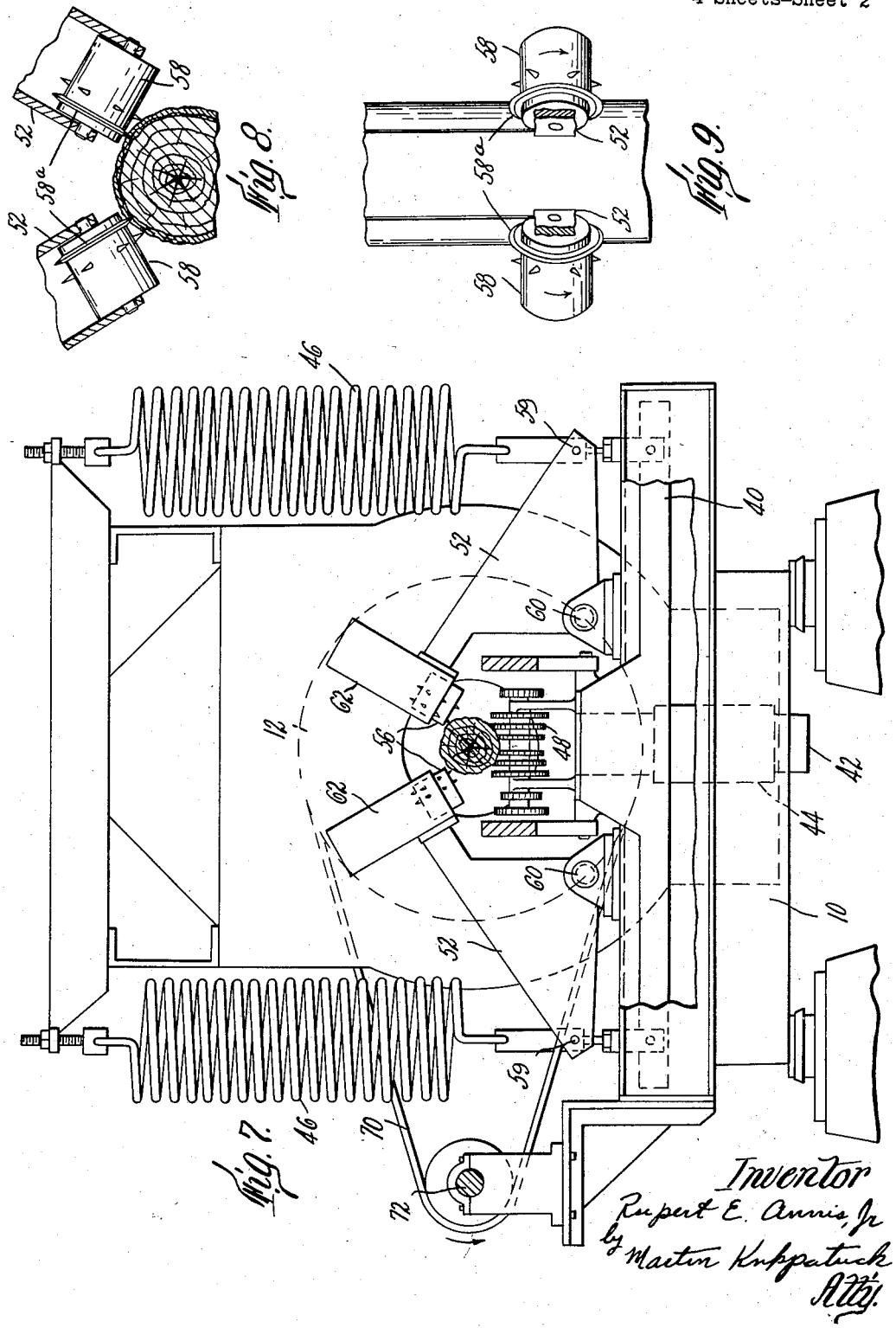

United States Patent Office 2,880,771
Patented Apr. 7, 1959

2,880,771

BARK-REMOVING TOOLS MOUNTED ON REVOLVING SELF-OPENING ARMS

Rupert E. Annis, Jr., Nashua, N.H., assignor to Improved Machinery, Inc., Nashua, N.H., a corporation of Maine Application March 17, 1955, Serial No. 494,948

1 Claim. (Cl. 144—208)

This invention relates to apparatus for removing bark from logs and more particularly to novel tools for such apparatus.

Barking machines of the type having a plurality of bark-removing tools mounted in an annular rotating member and pressed radially inwardly into contact with a log fed axially therethrough are known in the art. The tools employed in such machines are of a number of types, which in general may be divided into pressure tools which rely upon the force applied to the bark by a blunt tool to rupture the bond between the bark and the wood, and scraping tools which simply scrape the bark from the log. The latter type of tool appears in theory to be superior in its bark-removing action, but sometimes has heretofore been subject to the defect of riding upon the surface of the bark, where it is not effective, rather than penetrating the bark to the wood where it can operate effectively to scrape or shear the bark from the wood. Such defect has been particularly serious in the self-opening type of machine wherein the bark-removing tools are mounted at the respective ends of inwardly extending arms which are resiliently pressed inwardly as by springs and are arranged to be swung outwardly by engagement with the advancing leading end of a log so that the tools will operate on the outer surface of the log to remove the bark. This is because such heretofore-known scraping type of tools have not been effective immediately and uniformly to penetrate the bark layer to begin their scraping and shearing action, and consequently have tended to leave a collar of bark a few inches long around the leading end of logs advancing through the machine. The amount of bark thus left on each of the logs may reach a substantial percentage of the total bark under some conditions, particularly when relatively short pulpwood logs of hardwood are being debarked.

I have discovered that the ring of bark left by the heretofore known self-opening barking tools in the above mentioned apparatus may be eliminated, and improved debarking accomplished, by providing on each of the debarking tools themselves at the end of the supporting arm a sharp leading edge of such a shape and so mounting each tool with respect to its arm that the tool will immediately act to cut through the layer of bark and at the outset permit the leading face of the tool to descend entirely through the bark layer and begin its desired scraping or shearing action without delay. As hereinafter more fully explained, it is essential that such face with its leading radially positioned edge extend outwardly beyond the inwardly curved log-engaging surface of the arms on which the tools are mounted for a distance approximately as great as the thickness of the bark to be removed and in a direction generally perpendicular to the axis of the log. With such an arrangement, the tool will usually enter and penetrate cleanly immediately upon reaching the advancing bark-covered end of a log, although under certain circumstances, with especially hard and thick or frozen bark, I prefer to employ slitter rolls in advance of the bark removing tools to slit the bark longitudinally and hence provide easier and more certain immediate access for the barking tools and reduce the required scraping-tool pressures.

Various other objects and features of my invention will become apparent from the following description of a preferred embodiment of my invention, together with the accompanying drawings wherein:

Fig. 1 is a longitudinal section showing generally the feeding and bark-removing elements of the barking machine of the invention;

Fig. 2 is an enlarged side elevation of a bark-removing tool and its arm as shown in Fig. 1;

Fig. 3 is an end elevation, partly in section, of the tool and arm of Fig. 2;

Fig. 4 is a diagrammatic side elevation of the action of the tools of the machine of Fig. 1 in removing bark from a log;

Fig. 5 is a diagrammatic end elevation of the action of the tools of the machine of Fig. 1 in removing bark from a log, the latter being shown in section as is indicated by the line 5—5 of Fig. 4;

Fig. 6 is a horizontal section of the tool and arm of Fig. 2 taken on the line 6—6 thereof;

Fig. 7 is a combined right-end elevation and vertical section of the machine as seen from the two planes indicated by the line 7—7 of Fig. 1;

Fig. 8 is an enlarged fragmentary vertical section, as taken on the line 8—8 in Fig. 1, and shows the action of the slitter rolls;

Fig. 9 is an enlarged fragmentary plan of the action of the slitter rolls of Fig. 8;

Figures 10, 11:
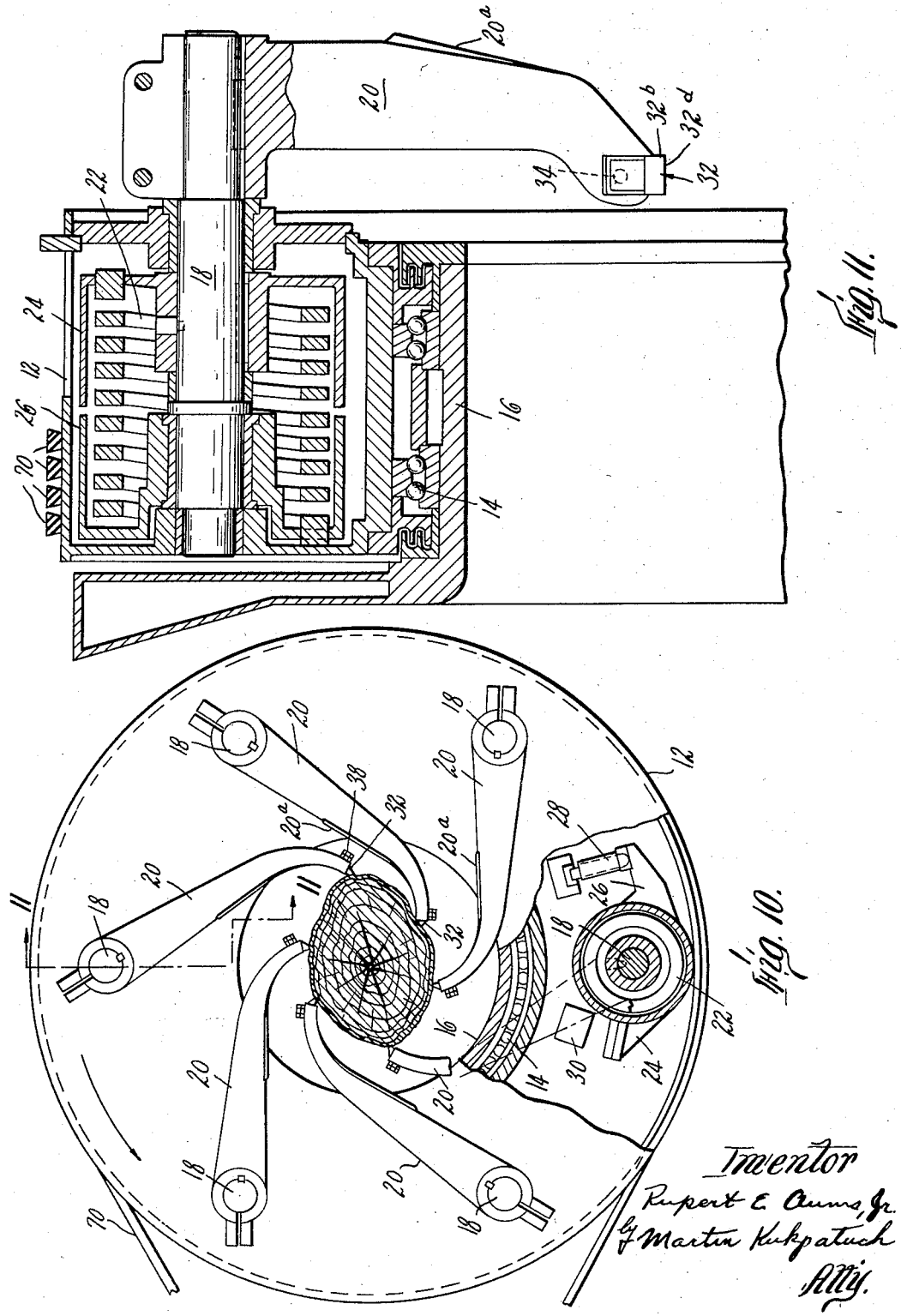
Fig. 10 is an enlarged right-end elevation of the bark-removing mechanism as seen from the viewing line 10—10 of Fig. 1, parts being broken away and shown in section.
Fig. 11 is a still further enlarged vertical section of the bark-removing mechanism, as taken on the line 11—11 of Fig. 10.
Figure 12:
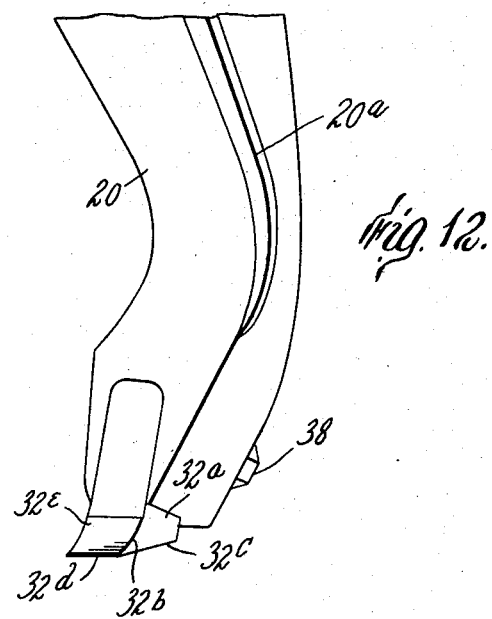
Fig. 12 is an enlarged rear perspective view of the tool and arm of Figs. 2 through 6.
Figure 13:
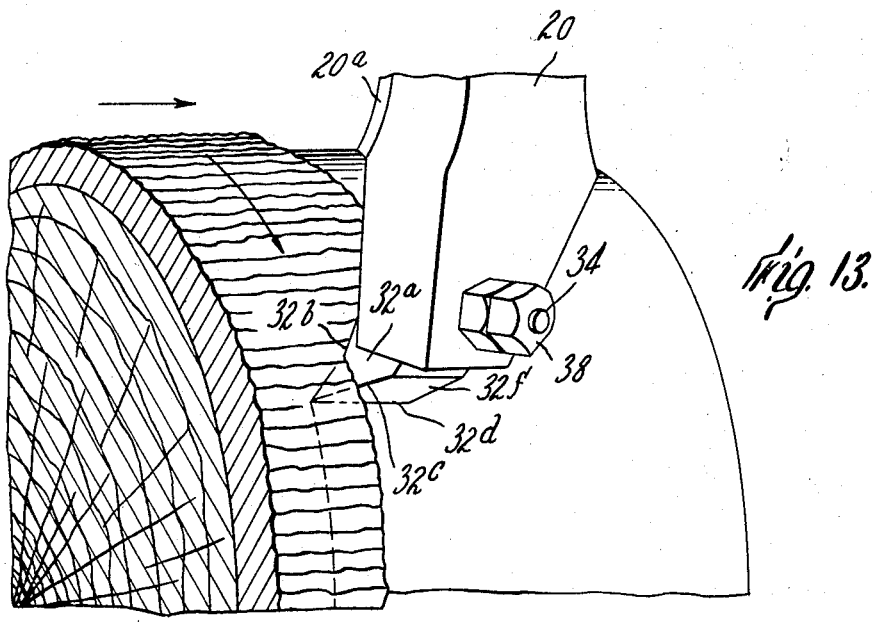
Fig. 13 is an enlarged front perspective view of the tool of Figs. 2 through 6 removing bark from a log.

In general, the major elements of the barking machine consist of a bark-removing mechanism mounted midway along a frame 10, and a pair of feeding mechanisms mounted at either side thereof for moving a log axially through the bark-removing mechanism, a front holddown mechanism closely adjacent the bark-removing mechanism at the forward side thereof and a rear holddown mechanism closely adjacent the bark-removing mechanism at the rear side thereof.

The bark-removing mechanism includes a drum-like element 12 rotatably supported by suitable bearings 14 on a stationary tube 16 which is itself mounted on the frame 10. On the drum 12 are rotatably mounted six shafts 18 spaced at equal distances from the central axis of the drum element and from each other and with their axes generally parallel to said central axis. Each of said shafts supports an arm 20 mounted for swinging movement toward and away from the central axis of drum 18 and with the arm 20 carrying a bark-removing tool 32. Torsion springs 22 are interposed between said shafts 18 and drum 12 to urge said tools toward said central axis to remove the bark from a log being pasesd axially therethrough generally along said central axis, said springs each being mounted at one end on the associated shaft 18 by an oscillatable mounting member 24 keyed to said shaft and at the other end being retained by a stationary (with respect to the drum) mounting member 26 having a journal that mounts said shaft for rotative oscillation therein. An adjusting screw 28 is interposed between an abutment on said second mounting member 26 and said drum to permit adjustment of spring pressure and hence tool pressure. Preferably, a stop 30 is also provided on the drum 12 which stop is contacted by an abutment on the oscillatable mounting member 24 to prevent the tools 32 from contacting one another when no log is in the mark-removing mechanism.

According to the present invention, the leading side of each of the tool-carrying arms 20, when considered from the pivoted end toward the scraping end, slopes rearwardly in the direction of log advance and each arm 20 is also curved inwardly or toward the periphery of a log being debarked so as to give the inner end of each arm a somewhat bowed shape, the curved leading edge or face of the arm departing at an increasing leading angle to a plane tangential to the periphery of a log at the scraping edge of the tool, and the sloping leading side of arm 20 forming a leading angle, as shown in Fig. 6, of the order of 30 to 60° near the tip of the arm and increasing outwardly along the sloped leading side of the arm to provide a suitable log-engaging forward or leading edge to assure that an arm, when engaged by a log being moved axially thereof, will open when rotated with the drum 12. Preferably, a sharpened leading edge portion 20a is provided on the leading edge of the arm for better engagement with a log. On the tips of each of the arms 20 is provided a recess having therein a lug 34 for retaining a tool 32, said lug passing through a hole 36 in said tool and co-operating with a nut 38 to maintain the tool rigidly in position. It is essential in the practice of this invention that the tool 32 have a bark-engaging leading face 32e, and a shearing side 32a extending perpendicularly with respect to the central axis of drum 12, said shearing side 32a projecting outwardly for a distance but slightly greater than the thickness of the bark as shown, beyond the log-engaging leading edge 20a of its arm 20 and at an angle thereto, and that said tool 32 have a sharp leading edge 32b on the edge of shearing side 32a adjacent the leading face 32e and a trailing edge 32c bounding such side 32a on the side adjacent a trailing face 32f, such edges being of a length great enough to permit the working edge 32d of the tip of the tool extending generally parallel to the central axis of drum 12 to scrape the bark from the log. I have also found it advantageous to dispose the leading shearing side 32a at a 90° angle to the direction of log travel and to have such side 32a join the leading face 32e at the sharp, leading corner edge 32b, preferably at an angle of about 90° as shown, whereby said corner edge 32b helically severs a bark ribbon from the remaining bark as the ribbon is sheared away from the log by the working edge 32d. With such arrangement, when the forward end of the log to be barked moves against the arm edge 20a as the drum 12 is being rotated in a direction counterclockwise as shown in Fig. 10, the forward or log-engaging edge 20a of the arm 20 will be engaged by the log and swung outwardly and away from the central axis against the force of the spring 22 until the arm has opened sufficiently to permit the tip of tool 32 to enter the bark. The sharp, leading edge 32b, under the pressure of the spring, will cause the tool to enter and cut through the bark directly and cleanly and thereafter said spring will maintain the working or scraping edge 32d of the tool in contact with the wood, the leading face 32e of the tool meeting said previously mentioned tangential plane at a leading angle that can vary between 45° and 90° and still permit the leading face of the tool to scrape or shear bark from a log. The tools 32 must be of small dimensions relative to such log and must extend for but a short distance axially of such log so that irregular logs will be effectively debarked and unit tool pressure will remain high. Also, they may be suitably spaced around the axis of the drum so that their total scraping area may be utilized to provide rapid bark removal, each tool tip traveling in a generally helical path around the advancing log and adjoining said path of the preceding tool tip (Figs. 4 and 5).

The front and near log-feeding and hold-down mechanisms (which form no part of the present invention) co-operate to present a log to, and centrally advance a log through, the rotating bark-removing mechanism while supporting the log substantially on the central axis of said mechanism and preventing rotation of the log, so that the bark-removing tools will operate most effectively since the bark-removing mechanism itself provides very little log support. Furthermore, this necessary supporting function is provided even with relatively short logs, since the feed mechanism need extend for but a short axial distance adequately to support a log in cantilever and also may be placed closely adjacent the bark-removing tools, both front and rear. Thus, by using such feed mechanism both in front of and behind the bark-removing mechanism and spaced closely thereto, logs as short as the distance between the supporting elements of said feed members will be adequately supported in cantilever to be operated upon by the tools 32 and such log will not only be presented, supported, and held on the central axis of said mechanism irrespective of the diameter of the log, but all the bark will be removed therefrom.

The two log-feeding and hold-down mechanisms being nearly identical, the forward set only of such mechanisms will herein be described in detail, and the modifications of the rear mechanism later pointed out. The forward log-feeding and hold-down mechanisms in essence form a three-jaw self-centering chuck. The lower jaw of said chuck comprises a transversely extending beam 40 mounted below the central axis of the drum 12 and having a vertical post 42 mounted thereon and generally centrally thereof and extending downwardly through a suitable bearing 44 in the frame 10 to permit vertical movement of the beam 40 toward and away from the central axis. A pair of coil tension springs 46 are provided, one at each end of the beam 40, extending upwardly between said beam and frame 10 of the machine to urge said beam yieldably upwardly toward the central axis.

For advancing a log, power-driven means are provided on the beam 40, said means including a plurality of spur rolls 48, preferably three in number with their axes perpendicular to a vertical plane containing the central axis of the drum 12 and spaced therealong to provide an adequate log support in cantilever. The spur rolls 48 are mounted in suitable bearings midway along the beam 40 and are driven to advance a log through the feed mechanism and present it to the bark-removing mechanism.

A pair of upper jaws comprising the other two jaws of the three-jaw chuck are each mounted to co-operate with the lower jaw to support a log. Each of such jaws comprises a lever 52 which has rotatably mounted at its upper log-confronting free end in suitable bearings a plurality of spur rolls comprising two forward rolls 56 and a rear slitter-disk roll 58 axially spaced for aiding the lower spur rolls 48 in supporting a log along the central axis without rotation, said roll 58 being provided with a disk 58a (see Figs. 8 and 9) for longitudinally slitting the bark to aid its immediate penetration and subsequent removal by the bark-removing tools 32. An outer lower corner of the lever 52 is mounted on an end of the spring-supported beam 40 by a suitable pivot pin 59. An inner lower corner of the lever 52 is supported by a fixed pivot shaft 60 mounted on the frame 10. Thus, by so interconnecting the levers 52, the upper-jaw spur rolls 56 and 58 will be moved toward and away from the central axis in synchronism with the lower-jaw spur rolls 48, the springs 46 causing the movement toward said central axis.

In order that the jaws may be opened automatically by an oncoming log, the upper jaws are each provided with a log-actuated cam surface 62, such surface extending forwardly and outwardly from the log-confronting free end of the lever 52 at an angle of about 30° to the central axis and terminating at a distance great enough to be actuated by the largest-diameter log which the machine is intended to debark. A guide roll 64 of hourglass configuration is positioned in front of the lower-jaw spur rolls 48 to guide logs generally centrally of said spur rolls.

The rear feed mechanism is identical to the above-described mechanism except in the provision on its lower jaw of a downwardly and forwardly slanted surface having an additional power feed roll 66 thereon to aid in receiving somewhat crooked logs from the bark-removing mechanism, and in the omission of any slitter-disk spur rolls.

The various elements of the barking machine of the invention all may be driven by a single electric motor (not shown) mounted on the frame 10 at the rear end thereof, although a gasoline or diesel engine may be used as well. Thus the drum 12 is driven on its outer surface by a plurality of V belts 70 driven from a main shaft 72. The forward and rear lower-jaw spur rolls 48 and 66 and the guide roll 64 are driven by suitable means (not shown). Clutches may be provided for the various elements as desired.

In operation, as the advancing end of the log comes into contact with the cam surfaces 62 on the upper-jaw levers 52, the jaws are opened and the leading end of the log is engaged by the lower-jaw spur rolls 48 and is fed to the bark-removing mechanism while being supported in cantilever. The slitter disks 58a of rolls 58 cut through the bark as the log passes through the forward feeding and hold-down mechanisms, and the engagement of the leading end of the log with the leading edges 20a of the arms 20 opens said arms until their tools engage the bark on the log, whereupon the bark is scraped from the entire outer surface of the log beginning at its head end as it passes through the bark-removing mechanism, the working edges 32d of the bark-removing tools 32, by reason of the springs 22, being pressed inwardly against the surface of the log so that the bark will be removed from the log even though the log has flat or even has concave portions. The rear feeding mechanism picks up the leading end of the log in the same manner as does the front, and supports the trailing end of the log in cantilever as it passes from the front feeding mechanism.

It will be appreciated by those skilled in this art that various modifications may be made within the scope of the invention that is defined by the appended claim.

I claim:

A barking machine comprising a frame, bark-removing means including a rotatable drum mounted on said frame, a plurality of self-opening arms mounted on said drum for swinging movement toward and away from the central axis of said drum about axes substantially parallel to said central axis, said arms having log-engaging edges each forming an angle of less than 90 degrees with said central axis in the direction of log travel, bark-removing tools on said arms and extending beyond the tips thereof, said tools each having a sharp leading edge extending outwardly beyond said log-engaging edge of said arm at an angle of substantially 90 degrees to said central axis, and said tools each having a shearing side bounded by said leading edge, said shearing side being in a plane substantially perpendicular to said central axis and of generally triangular shape with its outermost point defining one end of the working edge of said tool, said working edge extending parallel to said central axis, means for rotating said drum so as to revolve said arms and tools relatively to a log being fed through said drum and for advancing such log axially past said tools, and means for normally urging said arms toward said central axis, said tools being swung open upon engagement of such log with said log-engaging edges to engage said tools with such log to penetrate and remove bark from such log as said tools are revolved by rotation of said drum.

References Cited in the file of this patent

UNITED STATES PATENTS

| 1,233,321 | De Cew | July 17, 1917 |
| 1,673,265 | Pangborn | June 12, 1928 |
| 2,688,349 | Nicholson | Sept. 7, 1954 |
| 2,718,910 | St. Clair | Sept. 27, 1955 |
| 2,749,952 | League | June 12, 1956 |
| 2,794,466 | Leffler | June 4, 1957 |
| 2,802,495 | Nicholson | Aug. 13, 1957 |
| 2,815,776 | Annis et al. | Dec. 10, 1957 |
| 2,821,220 | Nicholson | Jan. 28, 1958 |

FOREIGN PATENTS

| 27,126 | Finland | Jan. 31, 1955 |
| 1,070,548 | France | Feb. 24, 1954 |